US009149762B2

(12) United States Patent
Matsumura et al.

(10) Patent No.: US 9,149,762 B2
(45) Date of Patent: Oct. 6, 2015

(54) DEFECTLESS HYDROGEN SEPARATION MEMBRANE, PRODUCTION METHOD FOR DEFECTLESS HYDROGEN SEPARATION MEMBRANE AND HYDROGEN SEPARATION METHOD

(75) Inventors: Yasuyuki Matsumura, Osaka (JP); Takashi Maeda, Tokyo (JP); Minoru Ogawa, Tokyo (JP); Eiji Negishi, Tokyo (JP)

(73) Assignees: National Institute of Advanced Industrial Science and Technology, Tokyo (JP); JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/637,950

(22) PCT Filed: Mar. 7, 2011

(86) PCT No.: PCT/JP2011/055207
§ 371 (c)(1),
(2), (4) Date: Dec. 18, 2012

(87) PCT Pub. No.: WO2011/122250
PCT Pub. Date: Oct. 6, 2011

(65) Prior Publication Data
US 2013/0092025 A1 Apr. 18, 2013

(30) Foreign Application Priority Data
Mar. 29, 2010 (JP) ................. 2010-074206

(51) Int. Cl.
*B01D 53/22* (2006.01)
*B01D 67/00* (2006.01)
*C23C 18/16* (2006.01)
*B01D 69/12* (2006.01)
*B01D 71/02* (2006.01)
*C01B 3/50* (2006.01)
*B01D 69/10* (2006.01)
*B01D 65/10* (2006.01)

(52) U.S. Cl.
CPC ............ *B01D 53/228* (2013.01); *B01D 65/108* (2013.01); *B01D 67/0069* (2013.01);
(Continued)

(58) Field of Classification Search
CPC ............... B01D 53/228; B01D 71/022; B01D 67/0069; B01D 67/0083; B01D 69/12; B01D 69/105; B01D 65/108; B01D 2325/04; C01B 3/505; C01B 2203/0405; C23C 18/1633
USPC ......... 96/4, 11; 95/45, 55, 56; 427/256, 443.1
See application file for complete search history.

(56) References Cited

U.S. PATENT DOCUMENTS 6,572,683 B2 * 6/2003 Yoshida et al. .............. 96/11
8,048,199 B2 * 11/2011 Saukaitis .................. 95/55
(Continued)

FOREIGN PATENT DOCUMENTS

JP 5-137979 A 6/1993
JP 06-084528 A 3/1994
(Continued)

OTHER PUBLICATIONS

International Search Report issued in PCT/JP2011/055207, with translation, mailed Jun. 7, 2011 (4 pages).

*Primary Examiner* — Jason M Greene
(74) *Attorney, Agent, or Firm* — Osha · Liang LLP

(57) ABSTRACT

A defect-free hydrogen separation membrane includes a metal thin membrane. The metal thin membrane includes a first metal layer composed of palladium on a porous support without substantial penetration into surface pores of the porous support and a second metal layer on the first metal layer. The second metal layer is a product of palladium deposition and closes defects being open on the surface of the first metal layer.

2 Claims, 1 Drawing Sheet

(52) U.S. Cl.
CPC .......... *B01D67/0083* (2013.01); *B01D 69/105* (2013.01); *B01D 69/12* (2013.01); *B01D 71/022* (2013.01); *C01B 3/505* (2013.01); *C23C 18/1633* (2013.01); *B01D 2325/04* (2013.01); *C01B 2203/0405* (2013.01)

(56) References Cited

U.S. PATENT DOCUMENTS

| | | | | |
|---|---|---|---|---|
| 8,052,775 | B2* | 11/2011 | Hou et al. | 95/55 |
| 2006/0016332 | A1* | 1/2006 | Ma et al. | 95/55 |
| 2006/0220080 | A1* | 10/2006 | Dubin et al. | 257/295 |
| 2006/0292294 | A1* | 12/2006 | Klein et al. | 427/99.5 |
| 2009/0120287 | A1* | 5/2009 | Del Paggio et al. | 95/56 |

FOREIGN PATENT DOCUMENTS

| | | | | |
|---|---|---|---|---|
| JP | 3213430 | B2 | 7/2001 | |
| JP | 2004-202479 | A | 7/2004 | |
| JP | 2007-69207 | * | 3/2007 | ............ B01D 71/02 |
| JP | 2007-069207 | A | 3/2007 | |
| JP | 4112856 | B2 | 4/2008 | |
| JP | 2009-045539 | A | 3/2009 | |

* cited by examiner

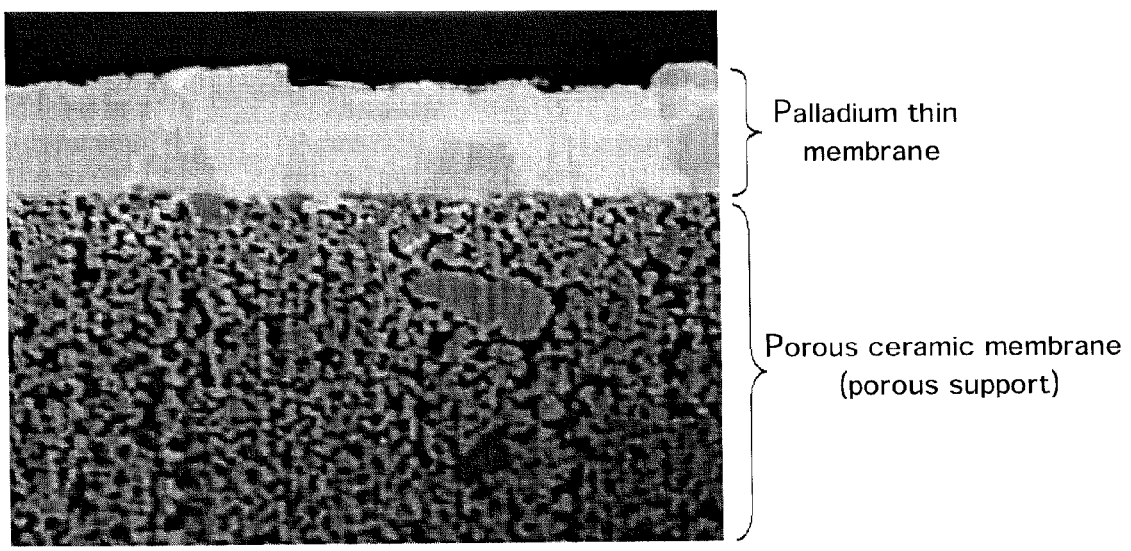

DEFECTLESS HYDROGEN SEPARATION MEMBRANE, PRODUCTION METHOD FOR DEFECTLESS HYDROGEN SEPARATION MEMBRANE AND HYDROGEN SEPARATION METHOD

TECHNICAL FIELD

The present invention relates to a defect-free hydrogen separation membrane, a method for producing a defect-free hydrogen separation membrane, and a hydrogen separation method.

BACKGROUND ART

Palladium membranes or palladium alloy membranes have selective permeability to hydrogen and deuterium, and are used as hydrogen separation membranes by virtue of this property.

When using the palladium membranes or the palladium alloy membranes as a hydrogen separation membrane, the smaller membrane thickness results in decrease in the hydrogen permeation rate and further decrease in the consumption of expensive noble metals such as palladium. Thus, a porous ceramic such as alumina is usually used as a support and a palladium thin membrane or a palladium alloy thin membrane is formed on the surface thereof by a plating method, such that the product is used as a hydrogen separation membrane (see Patent Document 1 described below).

On the porous ceramic, defects are usually present. When a palladium thin membrane or a palladium alloy thin membrane is formed by a conventional plating method, formation of defects (pinholes) on the membrane takes place more easily in case of the smaller membrane thickness. The pinholes cause reduction of the hydrogen purity (low hydrogen selectivity) after hydrogen separation and also cause degradation of membrane durability. As a method for preventing this, a method is disclosed wherein after carrying out a surface activating step of disposing a activating metal solution for electroless plating such that the pressure at one surface of a porous ceramic support is higher than the pressure at the other surface, to fill the activating metal solution in pores being open on the surface of the porous ceramic support, an electroless plating solution is disposed such that the pressure at one surface of the porous ceramic support contacting the electroless plating solution is higher than the pressure at the other surface to deposit a hydrogen separable metal such as palladium in the surface pores of the porous ceramic support, so that the pores are filled and choked with the hydrogen separable metal (see Patent Document 2 described below).

However, in this method there is a disadvantage that the hydrogen permeation rate decreases because the hydrogen separable metal is filled into the pores in the penetration depth of, for example, 30 μm (see Patent Document 3 described below). Thus, in Patent Document 3, after a surface activating step of disposing an activating metal solution for electroless plating such that the pressure at one surface of a porous ceramic support is equal to the pressure at the other surface to modify the surfaces of pores being open on the surface of the porous ceramic support with the activating metal solution, an electroless plating solution is disposed such that the pressure at one surface of the porous ceramic support contacting the electroless plating solution is higher than the pressure at the other surface to deposit a hydrogen separable metal such as palladium on the surface of the support and also in the surface pores of the porous ceramic support in a penetration depth of, for example, about 1 to 2 μm; thus, the hydrogen separable metal membrane is fabricated while choking tiny defects on the surface of the porous support. As a result, the hydrogen permeation rate is improved while the hydrogen selectivity is degraded. However, the metal in the pores still hinders hydrogen permeation, and a high hydrogen permeation rate is not always achieved with the hydrogen separation membrane.

The hydrogen permeance (k) of a hydrogen separation membrane whose main component is palladium generally follows the Sieverts' law. That is, $k=J/(p1^{0.5}-p2^{0.5})$, where J is a hydrogen permeation rate (mmol/s/m$^2$), p1 is a hydrogen partial pressure (Pa) at inlet, and p2 is a hydrogen partial pressure (Pa) at outlet. For example, on the basis of the hydrogen permeation data at 500° C. for a palladium membrane with a thickness of 1 μm and a metal penetration depth into pores of 1.5 μm as described in Patent Document 3, the hydrogen permeance thereof is calculated as 1.9 mmol/s/m$^2$/Pa$^{0.5}$, and the hydrogen permeance at 500° C. for a palladium membrane with a thickness of 2 μm and a metal penetration depth into pores of 1.5 μm is 1.4 mmol/s/m$^2$/Pa$^{0.5}$. The hydrogen permeance of a palladium membrane generally follows Arrhenius' equation. That is, $k=A \times e^{-E/RT}$, where A is a frequency factor, E is an activation energy, R is a molar gas constant, and T is an absolute temperature. In general, the activation energy for a palladium membrane is about 10 kJ/mol, and the hydrogen permeance at 400° C. is estimated as 1.5 mmol/s/m$^2$/Pa$^{0.5}$ for a palladium membrane with a thickness of 1 μm from the above-mentioned hydrogen permeance at 500° C., and the value is 1.1 mmol/s/m$^2$/Pa$^{0.5}$ for a palladium membrane with a thickness of 2 μm.

For gases other than hydrogen, the gas permeance (k') is generally expressed as $k'=J'/(p3-p4)$, where J' is a gas permeation rate (mmol/s/m$^2$), p3 is a gas partial pressure (Pa) at inlet, and p4 is a gas partial pressure (Pa) at outlet.

A parameter of hydrogen selectivity, for example, is a ratio of the hydrogen permeation rate to the permeation rate of gases other than hydrogen at a pressure difference of 1 atm (hydrogen separation ratio, R). That is, $R=J/J'=k \times 101325^{0.5}/(k' \times 101325)$. For example, when 75% of hydrogen is separated from a raw material gas having a hydrogen concentration of 80 vol. % at an inlet pressure of 10 atm and at an outlet pressure of 1 atm, it is estimated that a hydrogen purity of 99.9% or above is obtained at R is 4000 or more.

PRIOR ART DOCUMENTS

Patent Documents

Patent Document 1: Japanese Patent Laid-Open Publication No. H5-137979
Patent Document 2: Japanese Patent No. 3213430
Patent Document 3: Japanese Patent No. 4112856

SUMMARY OF THE INVENTION

Problems to be Solved by the Invention

The present invention has been devised in view of the present circumstances of conventional techniques described above, and a main object thereof is to provide a defect-free hydrogen separation membrane having a high hydrogen permeance and concurrently having a high hydrogen selectivity with a hydrogen separation ratio of 5000 or more, where a palladium thin membrane or a palladium alloy thin membrane, which is useful as a hydrogen separation membrane, without defects is supported on a porous ceramic membrane (porous support), and as a result, the consumption of expensive palladium is reduced. Also, it is an object to provide a method for producing the defect-free hydrogen separation membrane and provide a method for separating hydrogen with high efficiency.

Means for Solving the Problems

The present inventors have constantly conducted vigorous studies for achieving the objects described above. As a result, the inventors have found that a defect-free palladium thin membrane or palladium alloy thin membrane can be produced without choking the interiors of pores on a surface of a porous ceramic support by forming a metal layer being a precursor of a palladium thin membrane or a palladium alloy thin membrane on the porous ceramic support by conventional plating, then disposing an electroless plating solution containing palladium ions or at least one kind of metal ions forming a palladium alloy thin membrane such that the pressure at one surface of the porous ceramic support contacting the electroless plating solution is higher than the pressure at the other surface, and introducing the electroless plating solution to defects remaining on the surface to close the defects with palladium or at least one kind of metal forming a palladium alloy thin membrane while fabricating the membrane. The present invention has been thus completed.

That is, the aforementioned object of the present invention is achieved by a defect-free hydrogen separation membrane including a metal thin membrane having a first metal layer of palladium on a porous support without substantial penetration into surface pores of the porous support, and a second metal layer on the first metal layer, wherein the second metal layer is a product of palladium deposition and closes defects being open on the surface of the first metal layer.

In addition, the aforementioned object of the present invention is achieved by a defect-free hydrogen separation membrane including a metal thin membrane having a first metal layer, composed of at least one kind of metal forming a palladium alloy, on a porous support without substantial penetration into surface pores of the porous support, and a second metal layer on the first metal layer wherein the second metal layer is a product of deposition of at least one kind of metal forming a palladium alloy and closes defects being open on the surface of the first metal layer.

In this defect-free hydrogen separation membrane, the thickness of the metal thin membrane is preferably 3 µm or less.

The defect-free hydrogen separation membrane is preferably further subjected to a heat treatment.

The defect-free hydrogen separation membrane preferably has a hydrogen permeance of 3 mmol/s/m$^2$/Pa$^{0.5}$ or more at 400° C.

In case that metal forming a palladium thin membrane or a palladium alloy thin membrane is deposited on the metal thin membrane, the preferable total thickness of the defect-free hydrogen separation membrane is 6 µm or less.

The aforementioned object of the present invention is achieved by a method for producing a defect-free hydrogen separation membrane, including; an activation step of immersing one surface of a porous support in a solution containing an activating metal; a first metal layer forming step of immersing the one surface of the porous support in a plating solution containing palladium ions to form a first metal layer containing palladium; and a pressure difference applying step of immersing the one surface of the porous support with the first metal layer in a plating solution containing palladium ions, such that a pressure at the one surface side of the porous support is higher than a pressure at the other surface side, wherein palladium closes defects being open on the surface of the first metal layer during deposition on the surface.

The aforementioned object of the present invention is achieved by a method for producing a defect-free hydrogen separation membrane, including; an activation step of immersing one surface of a porous support in a solution containing an activating metal; a first metal layer forming step of immersing the one surface of the porous support in a plating solution containing metal ions forming a palladium alloy to form a first metal layer containing at least one kind of metal contained in the palladium alloy; and a pressure difference applying step of immersing the one surface of the porous support with the first metal layer in a plating solution containing palladium ions or metal ions forming the palladium alloy, such that a pressure at the one surface side of the porous support is higher than a pressure at the other surface side, wherein at least one kind of the metal contained in the palladium alloy closes defects being open on the surface of said first metal layer during deposition on the surface.

The aforementioned object of the present invention is achieved by a method for separating hydrogen from a gas mixture containing hydrogen, wherein the gas mixture containing hydrogen is disposed at one side of the defect-free hydrogen separation membrane and a hydrogen partial pressure at the other side is no more than a hydrogen partial pressure at the side of gas mixture containing hydrogen.

Effects of the Invention

According to the present invention, a defect-free hydrogen separation membrane can be formed by a relatively simple method even when the membrane thickness is small. This method does not require a large-scale production facility, and is very useful because of the advantages such as no need of strict process management, low yield loss, and easy mass production.

Since the defect-free palladium thin membrane or defect-free palladium alloy thin membrane obtained effectively prevents permeation of gases other than hydrogen and has excellent selective hydrogen permeation, the membrane can be effectively utilized as a hydrogen separation membrane for separating hydrogen from a gas mixture containing hydrogen.

BRIEF DESCRIPTION OF THE DRAWING

FIG. 1 is an image of scanning electron microscope showing a cross-section of a defect-free hydrogen separation membrane according to an embodiment of the present invention.

EMBODIMENTS OF THE INVENTION

At first, a defect-free hydrogen separation membrane and a method for producing the defect-free hydrogen separation membrane according to the present invention will be described. The defect-free hydrogen separation membrane of the present invention is a palladium thin membrane or a palladium alloy thin membrane formed on a porous ceramic membrane used as a porous support, wherein interiors of pores on the porous ceramic membrane are not substantially choked by palladium or metal forming a palladium alloy. Thus, even with a palladium thin membrane having a thickness of 3 µm or less, a defect-free property achieving a high hydrogen selectivity ratio of 5000 or more and a high hydrogen permeance of 3 mmol/s/m$^2$/Pa$^{0.5}$ or more can be realized at the same time.

As a material of the porous ceramic membrane, yttrium-stabilized zirconium oxide, zirconium oxide, cerium oxide, zirconia-ceria, alumina, silica, and titanium oxide can be exemplified. In particular, yttrium-stabilized zirconium oxide is preferable due to advantages such as stability at a high temperature and a thermal expansion coefficient similar to that of palladium. The porous ceramic membrane may be formed on a porous metal body such as a sintered metal and a metal mesh. A pore diameter of the porous ceramic membrane is preferably 0.02 to 1.0 μm, and further preferably 0.05 to 0.5 μm. The smaller pore diameter causes low hydrogen permeance preventing the practical application, and the larger pore diameter causes the difficulty for closing the pores with palladium or a palladium alloy.

A porous ceramic membrane whose defects on the surface are closed with metal in advance may be used as a porous support. Usage of this porous support in the present method results in effective formation of a palladium thin membrane or a palladium alloy thin membrane, and a defect-free membrane can be prepared in a good yield.

Shape of the porous ceramic membrane is not particularly limited, and may be appropriately determined depending on the way of use as a hydrogen separation membrane, but the porous ceramic membrane is usually used in the shape such as a plate, a hollow tube, and a blind-ended cylinder. A laminate of the porous ceramic membrane on the porous sintered metal body may be used as a porous support. In this case, the thickness of the porous ceramic membrane can be reduced, so that gas diffusion resistance associated with the thickness of the porous ceramic membrane can be alleviated. Since a metal joint and welding can be applied to the sintered metal body as a support of the porous ceramic membrane, it becomes easy to connect the hydrogen separation membrane to a metallic device. Stainless steel, Hastelloy® alloy, Inconel® alloy, nickel, nickel alloy, titanium, and a titanium alloy can be exemplified as a material of the sintered metal body. For example, in case of a substrate having a large surface pore diameter, such as a porous metal, a porous ceramic thin membrane may be formed in manner of filling in the surface pores. The thickness of the sintered metal body is not particularly limited as long as the structure thereof can be stably retained, but commonly, a thickness of 0.3 to 2 mm can be exemplified. A pore diameter of the sintered metal body is not particularly limited as long as a porous ceramic membrane laminated thereon can be stably retained, but commonly, a pore diameter of 1 to 100 μm can be exemplified.

The palladium alloy thin membrane is preferably composed of an alloy of palladium and at least one kind of metal selected from the group consisting of silver, gold, copper, nickel, platinum, rhodium, and ruthenium. The content of palladium in the palladium alloy is preferably 40 wt. % or more. An average thickness of the palladium thin membrane or the palladium alloy thin membrane is preferably 0.1 to 10 μm, and more preferably 0.2 to 6 μm. The smaller thickness causes an increase of pinholes on the membrane and reduction of hydrogen selectivity as a hydrogen separation membrane, and the larger thickness causes a low hydrogen permeance preventing the practical application.

Formation of a first metal layer as a precursor of the palladium thin membrane or the palladium alloy thin membrane on the porous ceramic membrane may be performed by a known method such as electroless plating, chemical vapor deposition, and magnetron sputtering, but electroless plating is the most convenient. An average layer thickness of the first metal layer as a thin membrane precursor is preferably 0.5 time or more, and further preferably 1 time or more of the average pore diameter of the porous ceramic membrane (porous support). The smaller layer thickness causes difficulty in covering the pore surface with the metal layer.

In electroless plating of metal, modification of fine catalyst particles for electroless plating on a substrate to be plated and reduction of the fine catalyst particles are usually carried out for surface activation of the substrate prior to electroless plating in a plating bath containing metal ions and a reducing agent. On the surface of the substrate to be plated in the electroless plating bath, the metal ions are reduced on the fine catalyst particles which become cores, then, the plating metal grows around the cores. Known reagents for electroless plating may be used here. An exemplary method for modifying the catalyst for electroless plating includes the steps of immersing a substrate to be plated in a solution containing metal ions such as tin ions, adsorbing the metal ions such as tin ions on the substrate surface, then, immersing the substrate in a catalyst solution containing palladium ions to replace the metal ions such as tin ions, modifying the surface, with the palladium ions, and reducing the same. Another method includes the steps of immersing the substrate in a catalyst solution, referred as alkali catalyst, in which the substrate is directly modified with palladium ions, and then, reducing the same.

To form the first metal layer as a precursor of the palladium thin membrane or the palladium alloy thin membrane on the porous ceramic membrane (porous support), any of the method may be used, but the alkali catalyst is preferably used due to convenience of the treatment. To modify the surface of the porous ceramic membrane with the catalyst, the surface of the porous ceramic membrane may be contacted with the catalyst solution. The catalyst solution may be introduced into the pores by making a pressure at one surface of the porous ceramic membrane in contact with the catalyst solution higher than a pressure at the other surface. To reduce the catalyst adsorbed, the surface of the porous ceramic membrane may be contacted with a solution containing a reducing agent. The solution containing a reducing agent may be introduced into pores by making a pressure at one surface of the porous ceramic membrane in contact with the solution higher than a pressure at the other surface. To reduce the catalyst, a reducing gas such as hydrogen may be used.

When using the porous ceramic membrane whose defects on the surface are closed with a metal in advance as a support, the surface of the porous ceramic membrane is modified with the catalyst and the catalyst is reduced in the similar manner as described above in a process of metal deposition on the defects, in some cases. Since the surface of the porous ceramic membrane has been already activated in this case, it is not always necessary to repeat the catalyst modification and the catalyst reduction.

After completion of the step of activating the surface of the porous ceramic membrane, electroless plating of metal is performed to form the first metal layer as a precursor of the palladium thin membrane or the palladium alloy thin membrane. A known electroless plating solution may be used. The electroless plating solution may be disposed at the side of the porous ceramic membrane surface (one surface side) subjected to the activation with the catalyst modification. At this time, it is not preferable that the pressure at the other surface side of the porous ceramic membrane is intentionally decreased below the pressure at the one surface side because the electroless plating solution penetrates into surface pores of the porous support and choke the pores.

Here, the average layer thickness of the first metal layer is preferably 0.04 to 1.0 μm, and further preferably 0.08 to 0.5 μm. The smaller layer thickness results in penetration of a plating solution to the pores to choke the pores in the next step, and the larger layer thickness prevents effective closure of the defects in the next step.

When the electroless plating of the metal forming the first metal layer as a precursor of the palladium thin membrane or the palladium alloy thin membrane is performed in this way, a defect-free metal membrane can be accordingly formed if one surface of the porous ceramic membrane is smooth and free from defects. In actual, however, there exist defects being open on the surface of the porous ceramic membrane, and therefore the defect sites become a cause of pinholes of the metal membrane. Even when a porous ceramic membrane whose defects on the surface are closed with metal in advance is used, remaining small defects become a cause of preventing formation of a defect-free metal thin membrane. To remove these pinholes, plating is usually carried out for a prolonged time, but it is not preferable because the thickness of the metal membrane increases. Thus, after the first metal layer as a precursor of the palladium thin membrane or the palladium alloy thin membrane mostly covers on the surface of the pores without penetration into the interiors of the main pores on the porous ceramic membrane, a second metal layer is plated onto the first metal layer formed, as a second stage of the metal membrane fabrication. At this time, an electroless plating solution is disposed at the one surface side of the porous ceramic membrane (surface side on which the first metal layer is formed), such that a pressure at the one surface side of the porous ceramic membrane is higher than a pressure at the other surface side of the porous ceramic membrane (surface side on which the first metal layer is not formed) to penetrate the solution into defects remaining on the first metal layer and/or on the porous ceramic membrane. As a result, the metal forming the palladium or palladium alloy thin membrane is deposited within these defects and the defects can be efficiently closed. A step of modifying the fine catalyst particles for electroless plating may be performed at the beginning of the second stage, although it is not always necessary in cases when the first metal layer in the first stage is palladium. In this step, a pressure at the one surface side of the porous ceramic membrane in contact with the catalyst solution may be higher than a pressure at the other surface side to introduce the catalyst solution into the defects. Also, when reducing the catalyst, a pressure at the one surface side of the porous ceramic membrane contacting the catalyst solution may be higher than a pressure at the other surface side to introduce the solution containing a reducing agent into the defects. The electroless plating solution in the second stage may be different from the electroless plating solution in the first stage.

According to this production method, as shown in FIG. 1, a defect-free hydrogen separation membrane can be produced by forming a membrane of palladium or metal forming a palladium alloy on one surface of a porous support without choking pores of a porous ceramic membrane (porous support) while suppressing generation of defects. Further, using this defect-free hydrogen separation membrane as a substrate, a defect-free hydrogen separation membrane having less defects can be produced.

That is, on the metal thin membrane formed herein, which includes the first metal layer and the second metal layer, metal forming the palladium thin membrane or the palladium alloy thin membrane may be deposited to provide a defect-free hydrogen separation membrane. Since the metal thin membrane as a substrate has already been defect-free, a known method may be applied as a deposition method, and a method such as electroplating, electroless plating, displacement plating, and chemical vapor deposition can be exemplified. The further defect-free membrane can be obtained by making a pressure at the thin membrane surface contacting a plating solution or a deposition gas higher than a pressure at the other surface side, i.e., support side, so that the plating solution or the deposition gas penetrates into very small defects remaining.

When a palladium thin membrane is fabricated on the porous ceramic membrane as described above, the product may be used for a hydrogen separation membrane as it is. However, heat treatment of the product is preferable to stabilize the performance. When metal forming the palladium alloy is deposited, the product may be used for a hydrogen separation membrane as it is. However, heat treatment is required to attain a perfect alloying state. The heat treatment can be usually performed by heating under an atmosphere of a reducing gas or an inert gas. As a reducing gas, a gas having a reducing property, such as hydrogen, carbon monoxide, and methanol can be used. As an inert gas, helium, nitrogen, and argon can be exemplified. The heat treatment may be performed under vacuum. The heat treatment may be carried out at an appropriate temperature, but preferably at 300 to 800° C. and more preferably at 400 to 700° C. The upper limit of the temperature for the heat treatment is determined in consideration of thermal durability of the porous ceramic or the sintered metal (when used as a support of the porous ceramic membrane) as well. To remove organic substances adhering to the surface of the hydrogen separation membrane, the membrane may be contacted with oxygen or a gas containing oxygen during the treatment.

The hydrogen separation membrane constituted in this way can be used for separating hydrogen exclusively from a gas mixture containing hydrogen in accordance with a usual method. For example, a gas mixture containing hydrogen may be disposed at any one side separated with the hydrogen separation membrane from the other side (one surface side of the hydrogen separation membrane) to be in contact with the one surface side of the hydrogen separation membrane, and a hydrogen partial pressure at the other surface side of the hydrogen separation membrane is made no more than a hydrogen partial pressure at the side of the gas mixture containing hydrogen. This allows hydrogen to permeate selectively through the hydrogen separation membrane, so that hydrogen present at the side of the gas mixture containing hydrogen can be moved to the opposite side and separated. A temperature of the hydrogen separation membrane in this case may be usually at about 150 to 700° C. and preferably at about 300 to 600° C. In case of too low temperature the palladium or palladium alloy thin membrane is easily brittle, and in case of too high temperature the membrane is easily deteriorated. Both the cases are unfavorable.

EXAMPLES

Hereinbelow, the present invention will be described further in detail with reference to Examples.

Example 1

A porous support having a ceramic porous thin membrane (porous ceramic membrane) with a layer thickness of 30 μm and an average pore diameter of 0.1 μm, prepared by coating yttrium-stabilized zirconium oxide particles on the outer surface of a blind-ended cylindrical sintered stainless metal filter (filter length, 5 cm; filter diameter, 1 cm) where an inner part and an outer part are isolated from each other, was immersed in a commercially available alkali catalyst at 50° C. to modify palladium ions on the outer surface, and was subsequently reduced in a commercially available reducing solution. Next, a commercially available electroless palladium plating solution was filled in the inner part of the blind-ended cylindrical sintered metal filter, and the outer surface of the ceramic porous thin membrane was immersed in an aqueous solution of glucose whose concentration is 4 mol/L at room temperature for an hour to obtain a porous support whose defects on the surface of the ceramic porous thin membrane were closed with palladium. The support was washed with water, then immersed in a commercially available electroless palladium plating solution at 50° C. to deposit palladium on the surface of the porous ceramic membrane. After the outer surface of the porous support was covered with a first metal layer of palladium, the inner part of the blind-ended cylindrical filter was evacuated to 0.1 atm with a pump to introduce the electroless palladium plating solution to through-hole defects remaining on the first metal layer of palladium and electroless palladium plating (plating of a second metal layer) was carried out. The average layer thickness of the first metal layer of palladium was estimated as 0.1 μm, and the average thickness of the final palladium thin membrane was 1.9 μm.

The resulting product was washed and dried, then heated to 400° C. under an argon stream, and subsequently heat-treated under a hydrogen atmosphere at 400° C. for 24 h to obtain a defect-free hydrogen separation membrane having a palladium thin membrane whose support is a porous ceramic membrane.

Gas permeation tests were carried out with the defect-free hydrogen separation membrane obtained by the above-mentioned method at a hydrogen pressure difference of 0 to 2 atm and an argon pressure difference of 0 to 4 atm. The hydrogen permeance obtained was 3.0 mmol/s/m$^2$/Pa$^{0.5}$ at 400° C. The permeance of argon was 0.9 nmol/s/m$^2$/Pa, and the hydrogen separation ratio was 11100 at a pressure difference of 1 atm.

Example 2

In the same manner of Example 1, a first metal layer of palladium was formed on a porous support whose defects on the surface of a porous ceramic membrane were closed with palladium as in Example 1, and subsequently the inner part of a blind-ended cylindrical filter was evacuated as in Example 1 to deposit a palladium thin membrane. The average layer thickness of the first metal layer of palladium was estimated as 0.3 μm, and the average thickness of the final palladium thin membrane was 1.4 μm.

The resulting product was washed and dried, then heated to 400° C. under an argon stream, and subsequently heat-treated under a hydrogen atmosphere at 400° C. for 24 h to obtain a defect-free hydrogen separation membrane having a palladium thin membrane whose support is a porous ceramic membrane.

As a result of gas permeation tests, the hydrogen permeance was determined as 4.0 mmol/s/m$^2$/Pa$^{0.5}$ at 400° C. The permeance of argon was 2.3 nmol/s/m$^2$/Pa, and the hydrogen separation ratio was 5400 at a pressure difference of 1 atm.

Example 3

In the same manner of Example 1, a first metal layer of palladium was formed on a porous support whose defects on the surface of a porous ceramic membrane were closed with palladium as in Example 1, and subsequently the inner part of a blind-ended cylindrical filter was evacuated as in Example 1 to deposit a palladium thin membrane. The average layer thickness of the first metal layer of palladium was estimated as 0.2 μm, and the average thickness of the final palladium thin membrane was 0.7 μm.

Subsequently, the defect-free hydrogen separation membrane having the palladium thin membrane formed on the porous support was immersed in an electroplating solution including ammine complexes of palladium and silver, and a palladium silver alloy was electro-plated on the palladium thin membrane under evacuation of the inner part of the blind-ended cylindrical filter to 0.1 atm with a pump, so that a palladium silver alloy thin membrane was formed on the palladium thin membrane.

The resulting product was washed and dried, then heated to 400° C. under an argon stream, and subsequently heat-treated under a hydrogen atmosphere at 400° C. for 50 h to diffuse silver into palladium, so that a defect-free hydrogen separation membrane having a palladium silver alloy thin membrane whose support is a porous ceramic membrane was obtained. The average silver content of the alloy obtained was 5 wt. %, and the average thickness of the alloy membrane was 1.7 μm.

As a result of gas permeation tests, the hydrogen permeance was determined as 3.5 mmol/s/m$^2$/Pa$^{0.5}$ at 400° C. The permeance of argon was 1.4 nmol/s/m$^2$/Pa, and the hydrogen separation ratio was 7900 at a pressure difference of 1 atm.

Example 4

In the same manner of Example 1, a first metal layer of palladium was formed on a porous support whose defects on the surface of a porous ceramic membrane were closed with palladium as in Example 1, and subsequently the inner part of a blind-ended cylindrical filter was evacuated as in Example 1 to deposit a palladium thin membrane. The average layer thickness of the first metal layer of palladium was estimated as 0.2 μm, and the average thickness of the final palladium thin membrane was 2.4 μm.

Subsequently, the defect-free hydrogen separation membrane having the palladium thin membrane formed on the porous support was immersed in an electroplating solution including ammine complexes of palladium and silver, and a palladium silver alloy was electro-plated on the palladium thin membrane under evacuation of the inner part of the blind-ended cylindrical filter to 0.1 atm with a pump, so that a palladium silver alloy thin membrane was formed on the palladium thin membrane.

The resulting product was washed and dried, then heated to 400° C. under an argon stream, and subsequently heat-treated under a hydrogen atmosphere at 400° C. for 50 h to diffuse silver into palladium, so that a defect-free hydrogen separation membrane having a palladium silver alloy thin membrane whose support is a porous ceramic membrane was obtained. The average silver content of the alloy obtained was 4 wt. %, and the average thickness of the alloy membrane was 4.0 μm.

As a result of gas permeation tests, the hydrogen permeance was determined as 2.4 mmol/s/m$^2$/Pa$^{0.5}$ at 400° C. The permeance of argon was 0.1 nmol/s/m$^2$/Pa, and the hydrogen separation ratio was 75000 at a pressure difference of 1 atm.

Example 5

In the same manner of Example 1, a first metal layer of palladium was formed on a porous support whose defects on the surface of a porous ceramic membrane were closed with palladium as in Example 1, and subsequently the inner part of a blind-ended cylindrical filter was evacuated as in Example 1 to deposit a palladium thin membrane. The average layer thickness of the first metal layer of palladium was estimated as 0.1 μm, and the average thickness of the final palladium thin membrane was 1.2 μm.

Subsequently, the defect-free hydrogen separation membrane having the palladium thin membrane formed on the porous support was immersed in an electroplating solution including an ethylenediamine complex of copper, and copper was electro-plated on the palladium thin membrane under evacuation of the inner part of the blind-ended cylindrical filter to 0.1 atm with a pump, so that a copper thin membrane was formed on the palladium thin membrane.

The resulting product was washed and dried, then heated to 400° C. under an argon stream, and subsequently heat-treated under a hydrogen stream at 400° C. for 24 h to perform alloying of the palladium thin membrane and the copper thin membrane plated thereon, so that a defect-free hydrogen separation membrane having a palladium copper alloy thin membrane whose support is a porous ceramic membrane was obtained. The average copper content of the alloy obtained was 40 wt. %, and the average thickness of the alloy membrane was 2.3 μm.

As a result of gas permeation tests, the hydrogen permeance was determined as 1.7 mmol/s/m$^2$/Pa$^{0.5}$ at 400° C. The permeance of argon was 0.7 nmol/s/m$^2$/Pa, and the hydrogen separation ratio was 7700 at a pressure difference of 1 atm.

Comparative Example 6

After surface defects of a porous ceramic membrane were covered with palladium as in Example 1, the inner part of a blind-ended cylindrical filter was evacuated as in Example 1 except the formation of the first metal layer of palladium, so that the palladium plating solution was introduced into surface pores of the porous ceramic membrane and a palladium thin membrane was fabricated. The average thickness of the final palladium thin membrane was 1.9 μm.

The resulting product was washed and dried, then heated to 400° C. under an argon stream, and subsequently heat-treated under a hydrogen stream at 400° C. for 24 h to obtain a hydrogen separation membrane having a palladium thin membrane whose support is a porous ceramic membrane.

As a result of gas permeation tests, the hydrogen permeance was determined as 2.2 mmol/s/m$^2$/Pa$^{0.5}$ at 400° C. The permeance of argon was 0.4 nmol/s/m$^2$/Pa, and the hydrogen separation ratio was 16700 at a pressure difference of 1 atm. When comparing Comparative Example 6 with Example 1, the hydrogen permeance for Example 1 was 3.0 mmol/s/m$^2$/Pa$^{0.5}$ and higher than 2.2 mmol/s/m$^2$/Pa$^{0.5}$ for the comparative example. Thus, the hydrogen separation membrane according to the present invention shows excellent hydrogen permeability.

The invention claimed is:

1. A method for producing a defect-free hydrogen separation membrane, comprising:
    an activation step of immersing one surface of a porous ceramic support in a solution containing an activating metal;
    a first metal layer forming step of immersing said one surface of the porous ceramic support in a plating solution containing palladium ions to form a first metal layer containing palladium without artificially producing pressure-differential between the one surface and the other surface of a porous support; and
    a pressure difference applying step of immersing said one surface of the porous support with said first metal layer in a plating solution containing palladium ions, such that a pressure at the one surface side of the porous support is higher than a pressure at the other surface side,
    wherein the first metal layer forming step is, substantially without abrading or polishing the first metal layer, followed by the pressure difference applying step; and
    wherein palladium closes defects being open on the surface of said first metal layer during deposition on the surface.

2. A method for producing a defect-free hydrogen separation membrane, comprising:
    an activation step of immersing one surface of a porous ceramic support in a solution containing an activating metal;
    a first metal layer forming step of immersing said one surface of the porous ceramic support in a plating solution containing metal ions forming a palladium alloy to form a first metal layer containing at least one kind of metal contained in the palladium alloy without artificially producing pressure-differential between the one surface and the other surface of a porous support; and
    a pressure difference applying step of immersing said one surface of the porous support with said first metal layer in a plating solution containing palladium ions or metal ions forming the palladium alloy, such that a pressure at the one surface side of the porous support is higher than a pressure at the other surface side,
    wherein the first metal layer forming step is, substantially without abrading or polishing the first metal layer, followed by the pressure difference applying step; and
    wherein at least one kind of the metal forming the palladium alloy closes defects being open on the surface of said first metal layer during deposition on the surface.

* * * * *